| (12) | United States Patent | (10) Patent No.: | US 9,097,371 B2 |
|---|---|---|---|
| | Graham | (45) Date of Patent: | Aug. 4, 2015 |

(54) FLEXIBLE PIPE HAVING PRESSURE ARMOUR LAYER AND COMPONENTS THEREOF

(75) Inventor: Geoffrey Stephen Graham, Newcastle upon Tyne (GB)

(73) Assignee: GE Oil & Gas UK Limited, Nailsea, Bristol (GB)

( * ) Notice: Subject to any disclaimer, the term of this patent is extended or adjusted under 35 U.S.C. 154(b) by 858 days.

(21) Appl. No.: 13/122,948

(22) PCT Filed: Aug. 12, 2009

(86) PCT No.: PCT/GB2009/051007
§ 371 (c)(1),
(2), (4) Date: Apr. 6, 2011

(87) PCT Pub. No.: WO2010/041047
PCT Pub. Date: Apr. 15, 2010

(65) Prior Publication Data
US 2011/0192485 A1    Aug. 11, 2011

(30) Foreign Application Priority Data
Oct. 9, 2008    (GB) .................................. 0818507.6

(51) Int. Cl.
*F16L 11/24*    (2006.01)
*F16L 11/16*    (2006.01)
*F16L 11/08*    (2006.01)

(52) U.S. Cl.
CPC ............... *F16L 11/16* (2013.01); *F16L 11/083* (2013.01)

(58) Field of Classification Search
CPC .................................. F16L 11/083; F16L 11/16

USPC ................. 138/129, 135, 136, 131, 139, 122; 174/109
See application file for complete search history.

(56) References Cited

U.S. PATENT DOCUMENTS 330,910 A  *  11/1885  Levavasseur ................. 138/136
605,487 A  *  6/1898  Rudolph ............................. 24/7
(Continued)

FOREIGN PATENT DOCUMENTS

| DE | 307448 C | 8/1918 |
|---|---|---|
| DE | 4303508 C1 | 3/1994 |

(Continued)

OTHER PUBLICATIONS

International Search Report and Written Opinion of the International Searching Authority, mailed Apr. 23, 2010, for corresponding International Application No. PCT/GB2009/051007, 25 pages.

(Continued)

*Primary Examiner* — Kevin P Shaver
*Assistant Examiner* — Robert Nichols, II
(74) *Attorney, Agent, or Firm* — Klarquist Sparkman, LLP

(57) ABSTRACT

An elongate tape element and method of manufacturing flexible pipe body are disclosed. The elongate tape element which is for providing at least one helically wound layer of windings in a flexible pipe body, comprises an elongate body having a base surface, a top surface opposed to the base surface and opposed first and second side walls extending between the base and top surfaces wherein at least one surface and/or side wall of the body comprises a recessed region for receiving a respective portion of a tape element holder member when said tape element is wound to form a layer of windings.

25 Claims, 4 Drawing Sheets

(56) References Cited

U.S. PATENT DOCUMENTS

| | | | | |
|---|---|---|---|---|
| 605,587 | A | * | 6/1898 | Levavasseur ............... 138/136 |
| 680,983 | A | * | 8/1901 | Rudolph ..................... 138/136 |
| 714,429 | A | * | 11/1902 | Witzenmann ............... 138/136 |
| 1,340,818 | A | | 5/1920 | Brinkman |
| 1,779,592 | A | | 10/1930 | Goodall |
| 1,913,390 | A | * | 6/1933 | Hungerford ............... 138/135 |
| 3,340,900 | A | | 9/1967 | Spurlock |
| 4,310,946 | A | * | 1/1982 | Baker et al. ................ 15/363 |
| 4,531,551 | A | | 7/1985 | Eichelberger et al. |
| 4,800,928 | A | * | 1/1989 | Kanao ........................ 138/122 |
| 4,862,924 | A | | 9/1989 | Kanao |
| 8,100,150 | B2 | * | 1/2012 | Jung et al. ................ 138/136 |
| 2004/0261878 | A1 | | 12/2004 | Jung et al. |

FOREIGN PATENT DOCUMENTS

| | | |
|---|---|---|
| FR | 420842 A | 2/1911 |
| FR | 737033 A | 12/1932 |
| GB | 191022719 A | 0/1911 |
| WO | WO2008/025893 A | 3/2008 |
| WO | WO2008/077409 A | 7/2008 |

OTHER PUBLICATIONS

International Preliminary Report on Patentability and Written Opinion of the International Searching Authority, mailed Apr. 21, 2011, for corresponding International Application No. PCT/GB2009/051007, 16 pages.

* cited by examiner

FLEXIBLE PIPE HAVING PRESSURE ARMOUR LAYER AND COMPONENTS THEREOF

CROSS REFERENCE TO RELATED APPLICATIONS

This is the U.S. National Stage of International Application No. PCT/GB2009/051007, filed Aug. 12, 2009, which in turn claims the benefit of Great Britain Application No. GB0818507.6, filed Oct. 9, 2008.

The present invention relates to flexible pipes which may be used to convey fluids such as production fluids. In particular, but not exclusively, the present invention relates to flexible pipe body and a method for manufacturing flexible pipe body having a layer formed by interlocking adjacent windings of helically wound tape. The invention further relates to tapes for forming such a layer.

Traditionally flexible pipe is utilised to transport production fluids, such as oil and/or gas and/or water, from one location to another. Flexible pipe is particularly useful in connecting a sub-sea location to a further sub-sea location or a sea level location. Flexible pipe is generally formed as an assembly of a length of flexible pipe body and one or more end fittings. The pipe body is typically formed as a composite of tubular layers of material that form a fluid and pressure containing conduit. The pipe structure allows large deflections without causing bending stresses that impair the pipe's functionality over a desired lifetime. The pipe body is generally, but not necessarily, built up as a composite structure including metallic and polymer layers. Flexible pipe may be utilised as a flowline over land and/or at a sub-sea location. Flexible pipe may also be used as a jumper or riser.

In many prior known flexible pipes of this type a "pressure armour layer" is utilised to help reinforce an internal pressure sheath such as a fluid barrier or liner and prevent radial expansion and burst through due to differential pressure conditions acting across the pipe. The pressure armour layer is thus important for the pressure retainment capability of the flexible pipe. The pressure armour layer may also act as a principal reinforcement layer providing collapse resistance.

Typically the pressure armour layer which acts as a hoop strength layer is formed by helically winding one or more tapes about an underlying layer whereby adjacent tape windings interlock, with a claw or hook at one edge of a tape winding interlocking with a corresponding recess or valley region at an opposite edge in an adjacent winding.

Prior known pressure armour profiles are numerous and many have a Zeta or S-shape. One such example is illustrated in the European Patent Application having Publication Number EP 0929767. This discloses a flexible conduit formed with a helically wound band of metal to provide resistance to burst pressure. The band has a leading edge lip or hook and a trailing edge hook which engage and interlock when the band is helically wound. The cross section of the band has an asymmetrical Z-shape profile with a main body section intermediate the band end edges. However, it is noted that the handling of such winding through manufacturing may be difficult due to the asymmetry of the wire. Effectively the wire wishes to roll over on its side during manufacturing. Also the wire profile of the pressure armour layer constrains the wire's height to width ratio such that it is difficult to get a profile having a relatively large height. The constraint to the wire's height to width ratio limits the internal and/or external pressures which the pipe is able to withstand.

It is an aim of the present invention to at least partly mitigate the above-mentioned problems.

It is an aim of embodiments of the present invention to provide flexible pipe body including a pressure armour layer which is relatively simple to manufacture relative to prior known armour layers.

It is an aim of embodiments of the present invention to provide a pressure armour layer which can be included in flexible pipe body to improve burst resistance and collapse resistance and which is formed from one or more helically wound tapes having improved stability with respect to alternative prior known tape.

It is an aim of embodiments of the present invention to provide a pressure armour layer in which the cross section profile of tape wound in an interlocked fashion to provide the pressure armour layer, provides a layer thicker than layers formed via prior known techniques.

According to a first aspect of the present invention there is provided an elongate tape element for providing at least one helically wound layer of windings in a flexible pipe body, comprising:

an elongate body having a base surface, a top surface opposed to the base surface and opposed first and second side walls extending between the base and top surface; wherein at least one surface and/or side wall of the body comprises a recessed region for receiving a respective portion of a tape element holder member when said tape element is wound to form a layer of windings.

According to a second aspect of the invention there is provided an elongate tape element holder member for providing at least one helically wound layer of interlocked windings in a flexible pipe body, a cross-section of the holder member comprising:

a first, generally concave, portion configured to retain a winding of a given elongate tape element; and a second, generally hooked, portion configured to engage an adjacent winding of an elongate tape element.

According to a third aspect of the invention there is provided an elongate composite tape for forming at least one helically wound layer of interlocked windings in a flexible pipe body for transporting production fluid, the tape being configured to interlock adjacent windings in the layer of tape by nesting a hooked region of a winding into a hook-receiving region of an adjacent winding, wherein the composite tape comprises:

an elongate tape element and a tape element holder member comprising a first portion configured to retain a given winding of the elongate tape element and a second, hooked, portion configured to engage an adjacent winding of the elongate tape element.

According to a fourth aspect of the invention there is provided a method for manufacturing flexible pipe body, comprising the steps of:

helically winding a preformed composite tape over an underlying layer interlocking adjacent winding of the composite tape by nesting a hooked region of a tape holder element of the composite tape in an adjacent winding of the composite tape.

According to a fifth aspect of the invention there is provided a method for manufacturing flexible pipe body, comprising the steps of:

simultaneously helically winding a tape element and a tape element holder over an underlying layer interlocking adjacent windings by nesting a hooked region of the tape holder element in an adjacent winding.

Certain embodiments of the present invention can provide an increased overall thickness of the profile of the windings in a pressure armour layer in comparison to prior known techniques. This allows the pressure armour layer to be thicker relative to a conventional layer thus enabling the pipe to resist higher burst pressures and increased hydrostatic external pressure than is otherwise possible with prior known pressure armour layers.

Certain embodiments of the present invention provide a tape which lies stably onto a pipe which improves handling of the tape through pipe manufacturing processes and allows an increase in an overall thickness of the tape layer without greatly increasing the overall width of the tape.

Certain embodiments of the present invention also include features able to reduce local stresses from forming in the tape and during wrapping of the tape around an inner layer. These features include, but are not limited to, increased corner radii at specific locations.

Certain embodiments of the present invention separate the functions of prior known interlocking layers. These separated functions are performed by respective parts of a composite tape. One part of the composite tape is a substantially block-like winding having a relatively high height to width ratio. This part may be manufactured from a particular type of material selected from a preferable range of materials to enhance pressure resisting performance. The other part of the composite tape performs an interlocking function. This may be provided either by a preformed tape having a convex and concave portion in which the windings of the first part of the composite tape are held together or alternatively may be formed during manufacture beginning with a flat strip which attains an interlocking shape as the pressure armour layer is generated during manufacturing. This second part of the composite tape can again be made from materials particularly well suited to the particular purpose of interlocking. This material can be the same or different from the material used for the first part of the composite tape.

A layer in the flexible pipe can be formed by winding a preformed composite tape or by simultaneously winding a tape and tape holder.

Embodiments of the present invention will now be described hereinafter, by way of example only, with reference to the accompanying drawings in which.

In the drawings like reference numerals refer to like parts.

Figure 1:
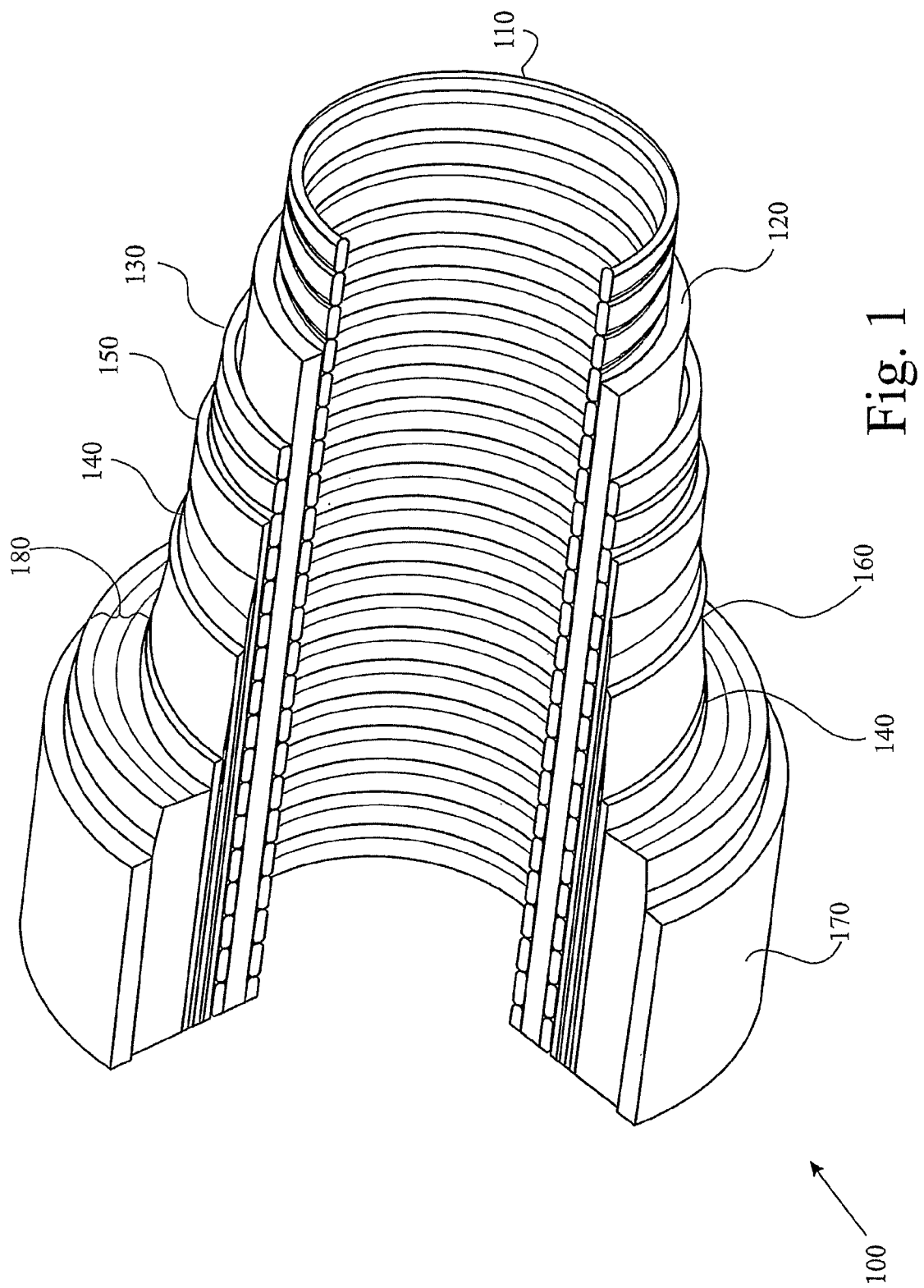
FIG. 1 illustrates flexible pipe body.

Throughout this specification reference will be made to a flexible pipe. It will be understood that a flexible pipe is an assembly of a portion of pipe body and one or more end fittings in each of which an end of the pipe body is terminated. FIG. 1 illustrates how a pipe body 100 is formed in accordance with an embodiment of the present invention from a composite of layered materials that form a pressure-containing conduit. Although a number of particular layers are illustrated in FIG. 1, it is to be understood that the present invention is broadly applicable to composite pipe body structures including two or more layers. It is to be further noted that the layer thicknesses are shown for illustrative purposes only.

As illustrated in FIG. 1, pipe body includes an innermost carcass layer 110 and a pressure sheath 120. The carcass 110 provides an interlocked metallic construction that can be used as the innermost layer to prevent, totally or partially, collapse of an internal pressure sheath 120 due to pipe decompression, external pressure, tensile armour pressure and mechanical crushing loads. It will be appreciated that embodiments of the present invention are applicable to 'smooth bore' as well as such 'rough bore' applications.

The internal pressure sheath 120 acts as a fluid retaining layer and typically comprises a polymer layer that ensures internal-fluid integrity. It is to be understood that this layer 120 may itself comprise a number of sub-layers. It will be appreciated that when the optional carcass 110 layer is utilised the internal pressure sheath 120 is often referred to as a barrier layer. In operation without such a carcass 110 (so-called smooth-bore operation) the internal pressure sheath 120 may be referred to as a liner.

A pressure armour layer 130 is formed over the internal pressure sheath 120 and is a structural layer with a lay angle close to 90° that increases the resistance of the flexible pipe body 100 to internal and external pressure and mechanical crushing loads. The armour layer 130 also structurally supports the internal-pressure sheath 120 and typically consists of an interlocked metallic construction.

The flexible pipe body 100 may also include one or more layers of tape 140 and a first tensile armour layer 150 and second tensile armour layer 160. Each tensile armour layer 150, 160 is a structural layer with a lay angle typically between 20° and 55°. Each layer 150, 160 is used to sustain tensile loads and internal pressure. The tensile armour layers 150, 160 are counter-wound in pairs.

The flexible pipe body 100 also includes an outer sheath 170 which comprises a polymer layer used to protect the pipe body 100 against penetration of seawater and other external environments, corrosion, abrasion and mechanical damage. One or more layers 180 of insulation may also be included.

Each flexible pipe comprises at least one portion, sometimes referred to as a segment or section of pipe body 100 together with an end fitting located at least one end of the flexible pipe body. An end fitting provides a mechanical device which forms the transition between the flexible pipe body and a connector. The different pipe layers as shown, for example, in FIG. 1 are terminated in the end fitting in such a way as to transfer the load between the flexible pipe and the connector.

Figure 2:
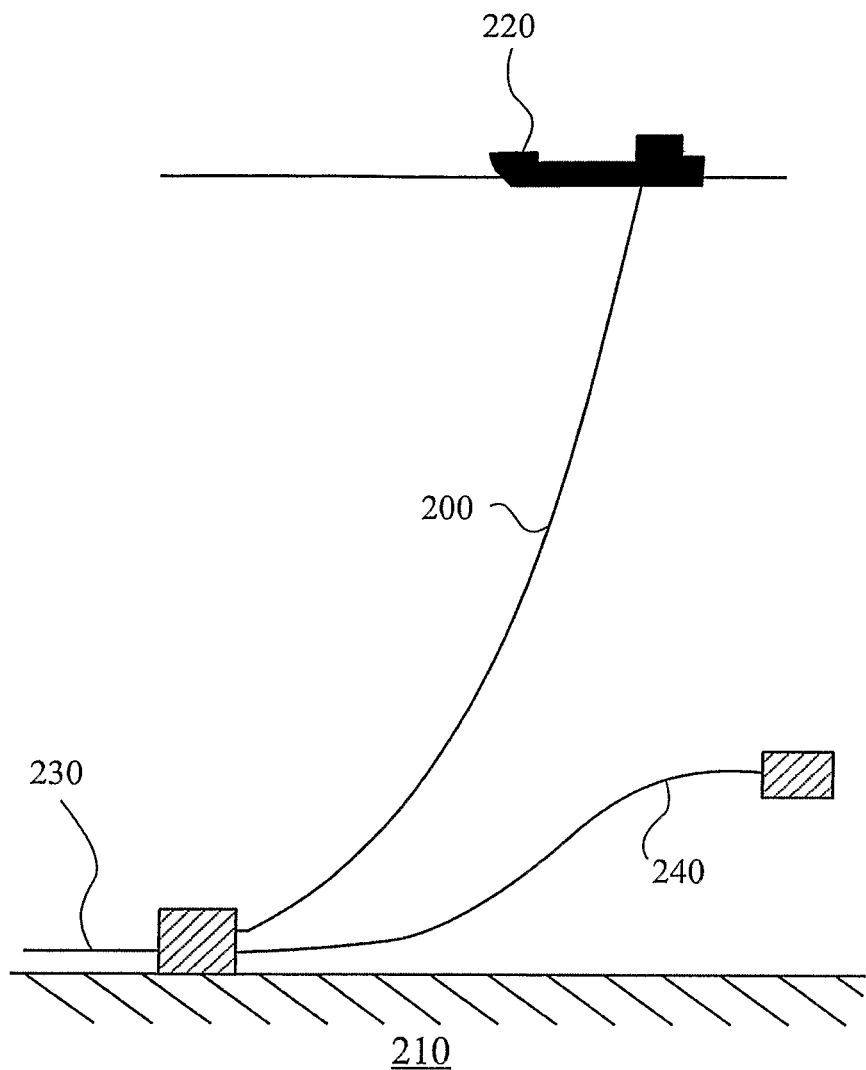
FIG. 2 illustrates a riser, flowline and jumper.

FIG. 2 illustrates a riser assembly 200 suitable for transporting production fluid such as oil and/or gas and/or water from a sub-sea location 210 to a floating facility 220. For example, in FIG. 2 the sub-sea location 210 is a connection to a sub-sea flow line 230. The flexible flow line comprises a flexible pipe, wholly or in part, resting on the sea floor or buried below the sea floor. The floating facility may be provided by a platform and/or buoy or, as illustrated in FIG. 2, a ship. The riser 200 is provided as a flexible riser, that is to say a flexible pipe connecting the ship to the sea floor installation. Alternatively the flexible pipe can be used as a jumper 240.

Figure 3:
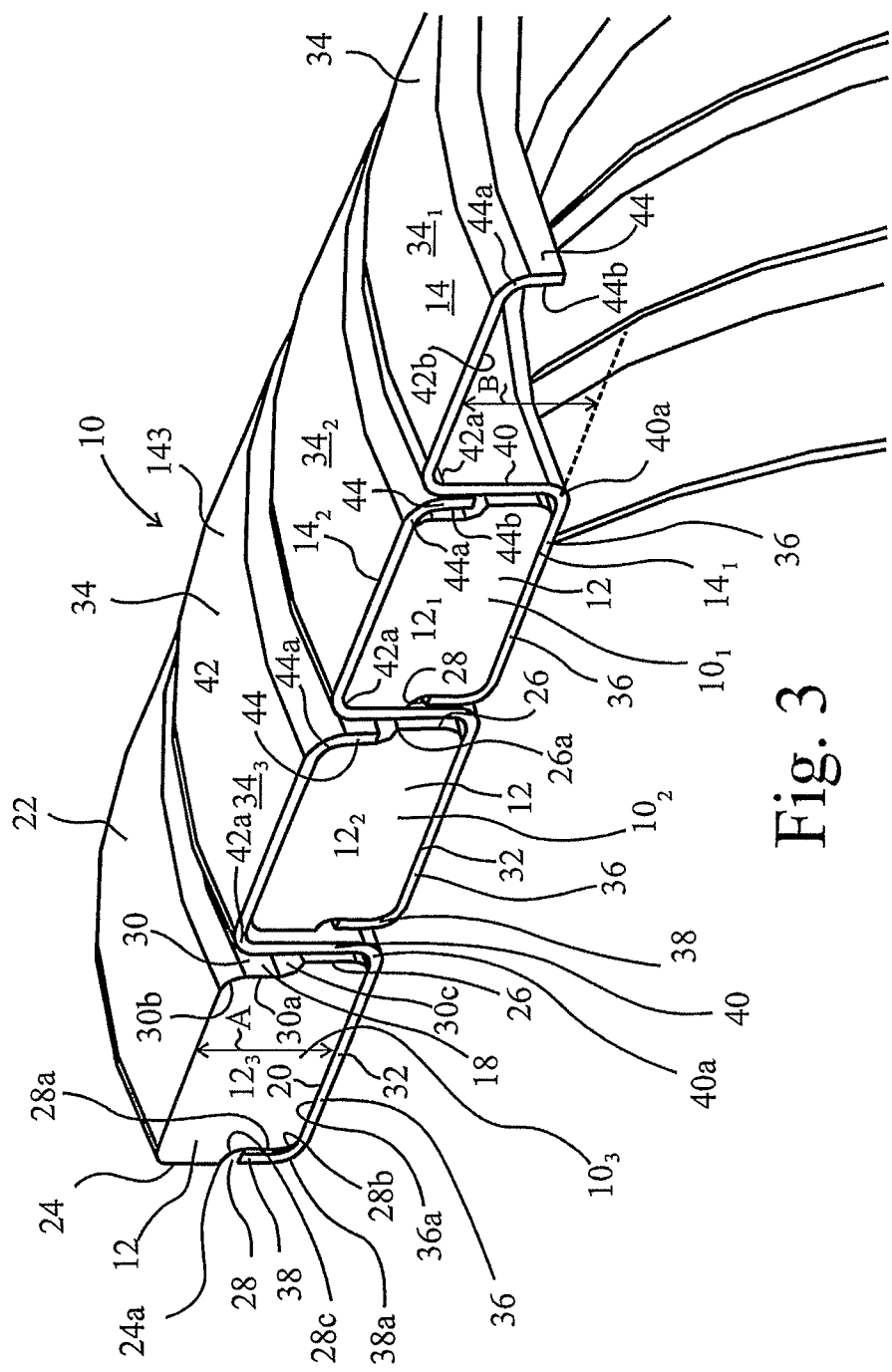
FIG. 3 illustrates a perspective cross section of a pressure armour tape according to the invention.

FIG. 3 illustrates a cross section of a tape 10 according to an embodiment of the present invention. Throughout this specification reference is made to a tape and it will be understood that such a term is to be broadly construed as encompassing an elongate structure having a preformed cross section or a desired cross section generated during manufacturing of the flexible pipe body and which can be wound in a helical fashion around an underlying structure, primarily to provide reinforcement or pressure resistance to the structure.

Figure 4:
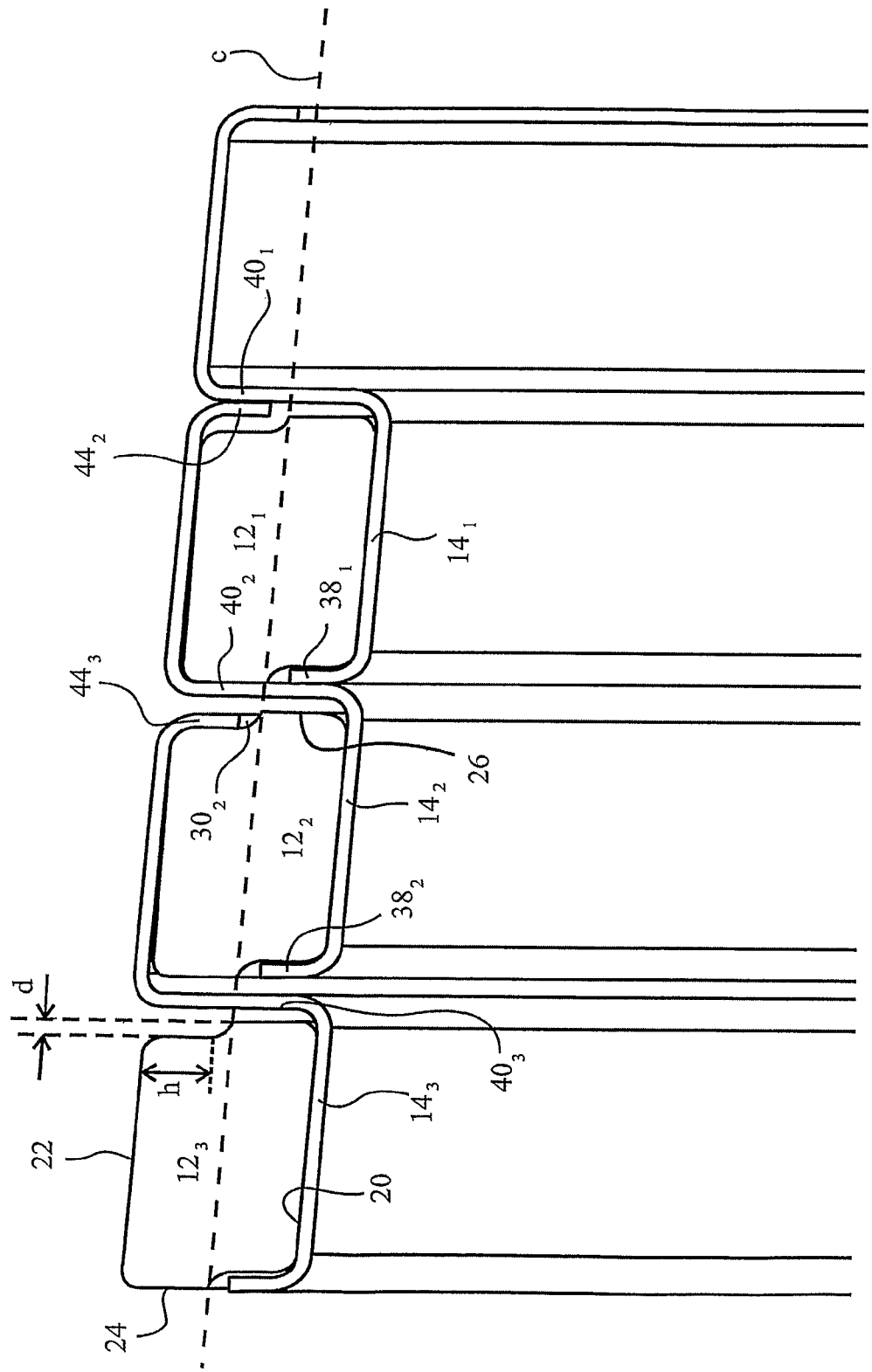
FIG. 4 is a cross section of the pressure armour tape of FIG. 3.

Tape 10 of FIG. 3 is a composite tape comprising an elongate tape element 12 and a tape element holder 14. In FIGS. 3 and 4 a continuous elongate composite tape is shown which is helically wound in a series of adjacent windings $10_1$, $10_2$ and $10_3$. Thus first winding $10_1$ includes tape element winding $12_1$ and tape element holder winding $14_1$, second winding $10_2$ includes tape element winding $12_2$ and tape element holder winding $14_2$ and third winding $10_3$ includes tape element winding $12_3$ and tape element holder winding $14_3$ and so on.

The tape element 12 comprises an elongate body which is most preferably a solid (monolithic) body and whose function is to provide the strength or reinforcement properties required of the composite tape element. That is, the tape element is configured to provide internal and/or external pressure resistance, and/or resistance to crushing loads. Tape element 12 thus functions as a so-called hoop strength layer. It can have a relatively high height to width ratio and can be made from a respective material having selected characteristics for providing good hoop strength. Alternatively the elongate body of the tape element can be a composite body formed from multiple elongate strands held in a matrix or loosely bound together.

The tape element holder 14 functions to retain the tape element 12 and to provide an interlocking effect between adjacent windings of the tape layer. The interlocking of the windings in the tape layer ensures that the pipe body can withstand bending forces. The interlocking is achieved by providing the tape element holder 14 with a hooked region 34 which is received in use in a hook receiving region 18 of an adjacent winding.

Tape element 12 is preferably invariant in shape along its length and is generally rectangular in cross section having a base surface 20, a top surface 22 opposed to the base surface and opposed first and second side walls 24, 26 extending between the base surface 20 and the top surface 22. The respective side walls 24, 26 include a recess 28, 30. A rebate 28 forming a recess is provided at the junction of base surface 20 with side wall 24 and a rebate 30 forming a further recess is provided at the junction of top surface 22 and side wall 26. The rebates are thus provided at opposite corners of the tape element 10. Each rebate 28, 30 may typically comprise approximately half of the dimension of the respective side wall 24, 26 as measured between base surface 20 and top surface 22. The rebate 30 on the second side wall includes a planar wall segment 30a. This planar wall segment 30a merges smoothly via curved surface portion 30b with top surface 22 and also merges with remainder of side wall 26 at a corner 26a via curved surface portion 30c. This provides an outwards step in the side wall. Similarly, the rebate 28 in the first side wall includes a planar wall segment 28a. This planar wall segment 28a merges smoothly via a curved surface portion 28b with the base surface 20 and also merges with remainder of side wall 24 at a corner 24a via curved surface portion 28c.

The tape element 12 may be made from a suitable metallic material such as hot or cold rolled steel, or a suitable composite material, depending, for example, on the intended service conditions. The tape element holder may be produced from a metallic material, polymeric material or composites, as appropriate to the particular intended use. The two parts of the composite tape may be formed from a common material or from different materials each selected to provide respective performance characteristics.

The tape element holder 14 comprises a first, generally concave, portion 32 configured to receive the elongate tape element 12 and a second, hooked, portion 34 configured to engage with and locate the tape element 12 in an adjacent winding. Thus, the interlocking of the adjacent windings of the tape 10 is achieved by engagement of the hooked portion 34 with the tape element 12 of an adjacent winding. In the example illustrated in FIGS. 3 and 4, hooked portion $34_3$ of a later adjacent winding $10_3$ engages tape element $12_2$ or an earlier adjacent winding $10_2$, hooked portion $34_2$ of a relatively later winding $10_2$ engages tape element $12_1$ of a relatively earlier winding $10_1$ and so on. Thus a winding of the tape element is held in a nested configuration by one region of the tape element holder whilst another, convex, region of the tape element holder hooks over or onto an adjacent winding of the tape element.

The first portion 32 of the tape element holder 14 comprises a base web 36 which is most preferably planar and which is arranged in confronting relation with the base surface 20 of the tape element 12. Preferably the upper surface 36a of base web 36 is maintained in contacting relation with the base surface 20 of the tape element. The tape element holder 14 further comprises opposed first and second side webs 38, 40 extending from opposed side margins of the base web 36. Side webs 38, 40 preferably extend substantially perpendicularly with respect to base web 36 and are substantially parallel to one another. The side webs 38, 40 merge smoothly into base web 36 via respective curved web portions 38a, 40a. The first and second side webs 38, 40 are arranged in confronting relation to the respective first and second side walls 24, 26 of the tape element 12, but are not necessarily in contacting relation therewith, as will be explained below. The side webs extend outwardly from the base web towards an imaginary centre line of the tape element holder.

The second portion 34 of the tape element holder 14 includes a cover web 42 extending from the second side web 40. The cover web 42 extends substantially perpendicularly with respect to the second side web 40 and merges smoothly into second side web 40 via a curved web portion 42a. Thus, cover web 42 is arranged substantially parallel to (but spaced apart from) base web 36. A third side web 44 extends from a distal (with respect to second side web 40) side margin of the cover web 42. This third side web 44 extends substantially perpendicularly with respect to cover web 42 and merges smoothly into cover web 42 via a curved web portion 44a. Third side web 44 is thus substantially parallel to the second side web 40. Free end edges 38c, 44c of the respective first and third side webs 38, 44 are directed towards an imaginary lateral centre line "C" which bisects the second side web 40. The tape element holder 14 thus has approximately the shape of a stylised letter "S". The third side web 44 is configured to be disposed in use in confronting relation (but not necessarily contacting relation) with a distal side wall 26 of the tape element 12 of an earlier adjacent winding. That is, internal face 44 of third side wall 44 is juxtaposed in use with planar wall segment 30a of rebate 30 of the tape element 12 of the adjacent (earlier) winding.

In preferred constructions the dimension "A" of the tape element between base surface 20 and top surface 22 is configured to be substantially the same as the dimension "B" of the second side web 40 between upper surface 36a of base web 36 and under surface 42b of cover web 42. In this construction, subject to normal design and manufacturing tolerances, when, in use, base surface 20 of tape element 12 is in contact with the upper surface 36a of base web 36, top surface 22 of the earlier tape element 12 of the adjacent winding also is in contact with under surface 42b of cover web 42.

The tape element 12 and the tape element holder 14 are constructed to allow limited relative displacement of the tape element 12 and the tape element holder 14 in a direction nominally parallel to imaginary lateral centre line "C". Such displacement is provided to allow for bending of the pipe.

As particularly illustrated in FIG. 4, the depth "d" and height "h" of the rebate 30 are sized fully to accommodate third side web 44 of the tape element holder 14 and similarly the depth and height of the rebate 28 are sized fully to accommodate the first side web 38. Taking as an example winding $14_3$ of the tape element holder 14 in relation to winding $12_2$ of tape element 12 and as shown in FIG. 4, it can be seen that winding 14₃ of the tape element 14 is in its maximally extended configuration in which third side web 44₃ is in contacting relation with planar wall segment 30a₂ of rebate 30₂. First side web 38₂ is spaced apart from second web 40₃ of the later adjacent winding and third side web 44₃ is spaced apart from second web 40₂ of the earlier adjacent winding. The compact configuration which may be adopted when the pipe is not in tension, or when the particular portion of the tape layer form the internal side of a pipe bend, is shown in FIG. 4 in relation to windings 14₂ and 14₁ of the tape element holder 14. In this compact configuration, third side web 44₂ is in contacting relation with second web 40₁ of earlier adjacent winding 14₁ and second web 40₂ is in contacting relation with first side web 38₁ of earlier adjacent winding 14₁.

The composite tape according to certain embodiments of the present invention is wound helically around components of a pipe body to provide a helically wound tape layer. The helical winding may comprises one or more starts. By providing a composite tape having as a first part a tape element and as a second part a tape element holder, functions of the tape are separated between the respective components of the composite tape. Thus, the interlocking function is provided by the tape element holder and the strength imparting function is provided by the tape element. The properties of the tape element and the tape element holder can thus be optimised to their respective functions. For example, the tape element can be made from a material with substantial uni-axial properties which would prevent it functioning effectively for interlocking, but which are advantageous in maximising strength. Such materials include composites with a high degree of directional bias to fibre reinforcement.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. An elongate composite tape for forming at least one helically wound layer of interlocked windings in a flexible pipe body for transporting production fluid, the tape being configured to interlock adjacent windings in the layer of tape by nesting a hooked region of a winding into a hook-receiving region of an adjacent winding, wherein the composite tape comprises:
   an elongate tape element and
   a tape element holder member comprising a first portion configured to retain a given winding of the elongate tape element and a second, hooked, portion configured to engage an adjacent winding of the elongate tape element,
   wherein the elongate tape element comprises a unitary body having a base surface, a top surface opposed to the base surface and opposed first and second side walls extending between the base surface and the top surface,
   wherein the first portion of the tape element holder member comprises a base web arranged in confronting relation with the base surface of the tape element and opposed first and second side webs extending from opposed side margins of the base web and arranged in confronting relation to the respective first and second side walls of the tape element, and
   wherein the first side wall of the unitary body of the tape element includes a rebate forming a recess sized and configured to receive the first side web of the tape element holder.

2. An elongate composite tape as claimed in claim 1 wherein the second portion of the holder member is configured to extend wholly over the adjacent winding of the elongate tape element.

3. An elongate composite tape as claimed in claim 1 wherein the elongate tape element is monolithic.

4. An elongate composite tape as claimed in claim 1 wherein the side webs of the tape element holder extend substantially perpendicularly with respect to the base web.

5. An elongate composite tape as claimed in claim 1 wherein the second portion of the tape element holder includes a cover web extending from the second side web and a third side web extending from a distal side margin of the cover web and configured to be disposed in use in confronting relation with a distal side wall of the tape element of an earlier adjacent winding.

6. An elongate composite tape as claimed in claim 5 wherein the third side web is substantially parallel to the second side web.

7. An elongate composite tape as claimed in claim 5 wherein the cover web is substantially parallel to the base web of the tape element holder.

8. An elongate composite tape as claimed in claim 5 wherein the second side wall of the tape element includes a recess sized and configured to receive, in use, the third side web of the tape element holder of a later adjacent winding.

9. An elongate composite tape as claimed in claim 5 wherein the second side web and the tape element are so sized that when, in use, the base surface of the tape element of a given winding is in contacting relation with the inward surface of the base web, the upper surface of the tape element of an adjacent winding is in contacting relation with the inward surface of a cover web of the adjacent winding.

10. An elongate composite tape as claimed in claim 5 wherein the dimension of the tape element of the adjacent winding is less than the corresponding dimension of the tape element holder between the second and third side webs.

11. An elongate composite tape as claimed in claim 5 wherein the third side web of the tape element holder extends for not more than about half the height of the tape element, measured between the base surface and the upper surface.

12. An elongate composite tape as claimed in claim 1 wherein the dimension of the tape element between the side walls is less than the corresponding dimension of the tape element holder between the first and second side webs.

13. An elongate composite tape as claimed in claim 1 wherein the first side web of the tape element holder extends for not more than about half the height of the tape element, measured between the base surface and the upper surface.

14. A flexible pipe body for transporting production fluids, comprising:
   at least one helically wound layer of the elongate composite tape as claimed in claim 1, adjacent windings in the layer of tape being interlocked by a hooked region of a winding nested in a hook-receiving region of an adjacent winding.

15. A flexible pipe body as claimed in claim 14 further comprising an internal pressure sheath, wherein said at least one tape layer comprises a pressure armour layer over the internal pressure sheath.

16. A flexible pipe body as claimed in claim 15 wherein said internal pressure sheath comprises a barrier layer or liner.

17. A flexible pipe body for transporting production fluids, comprising:
the elongate composite tape of claim 1.

18. A flexible pipe comprising the flexible pipe body as claimed in claim 17 and further comprising at least one end fitting.

19. A riser, flowline or jumper comprising the flexible pipe as claimed in claim 18.

20. A method comprising transporting a fluid through a riser, flowline, or jumper as claimed in claim 19.

21. A method for manufacturing flexible pipe body, comprising the steps of:
helically winding a preformed composite tape over an underlying layer interlocking adjacent windings of the composite tape by nesting a hooked region of a tape element holder of the composite tape in an adjacent winding of the composite tape,
wherein the composite tape element comprises:
an elongate tape element, and
the tape element holder,
wherein the tape element holder comprises a first portion configured to retain a given winding of the elongate tape element and a second, hooked, portion configured to engage an adjacent winding of the elongate tape element,
wherein the elongate tape element comprises a unitary body having a base surface, a top surface opposed to the base surface and opposed first and second side walls extending between the base surface and the top surface,
wherein the first portion of the tape element holder member comprises a base web arranged in confronting relation with the base surface of the elongate tape element and opposed first and second side webs extending from opposed side margins of the base web and arranged in confronting relation to the respective first and second side walls of the elongate tape element, and
wherein the first side wall of the unitary body of the elongate tape element includes a rebate forming a recess sized and configured to receive the first side web of the tape element holder.

22. The method as claimed in claim 21 wherein the hooked region of the tape element holder nests between a recessed region of the tape element of the adjacent winding and a side web of the tape element holder of the adjacent winding.

23. The method as claimed in claim 21 wherein the tape element holder has a preformed, substantially S-shaped cross section.

24. The method as claimed in claim 21 further comprising the steps of:
generating a substantially S-shaped cross-section for the tape element holder from a substantially flat cross section as the tape element holder is wound.

25. A method for manufacturing flexible pipe body, comprising the steps of:
simultaneously helically winding a tape element and a tape element holder over an underlying layer interlocking adjacent windings by nesting a hooked region of the tape element holder in an adjacent winding,
wherein the tape element holder comprises a first portion configured to retain a given winding of the tape element and a second, hooked, portion configured to engage an adjacent winding of the tape element,
wherein the tape element comprises a unitary body having a base surface, a top surface opposed to the base surface and opposed first and second side walls extending between the base surface and the top surface,
wherein the first portion of the tape element holder comprises a base web arranged in confronting relation with the base surface of the tape element and opposed first and second side webs extending from opposed side margins of the base web and arranged in confronting relation to the respective first and second side walls of the tape element, and
wherein the first side wall of the unitary body of the tape element includes a rebate forming a recess sized and configured to receive the first side web of the tape element holder.

* * * * *